Oct. 5, 1926.
H. WILDBERG
BOTTLE CRATE
Filed March 9, 1925
1,601,789
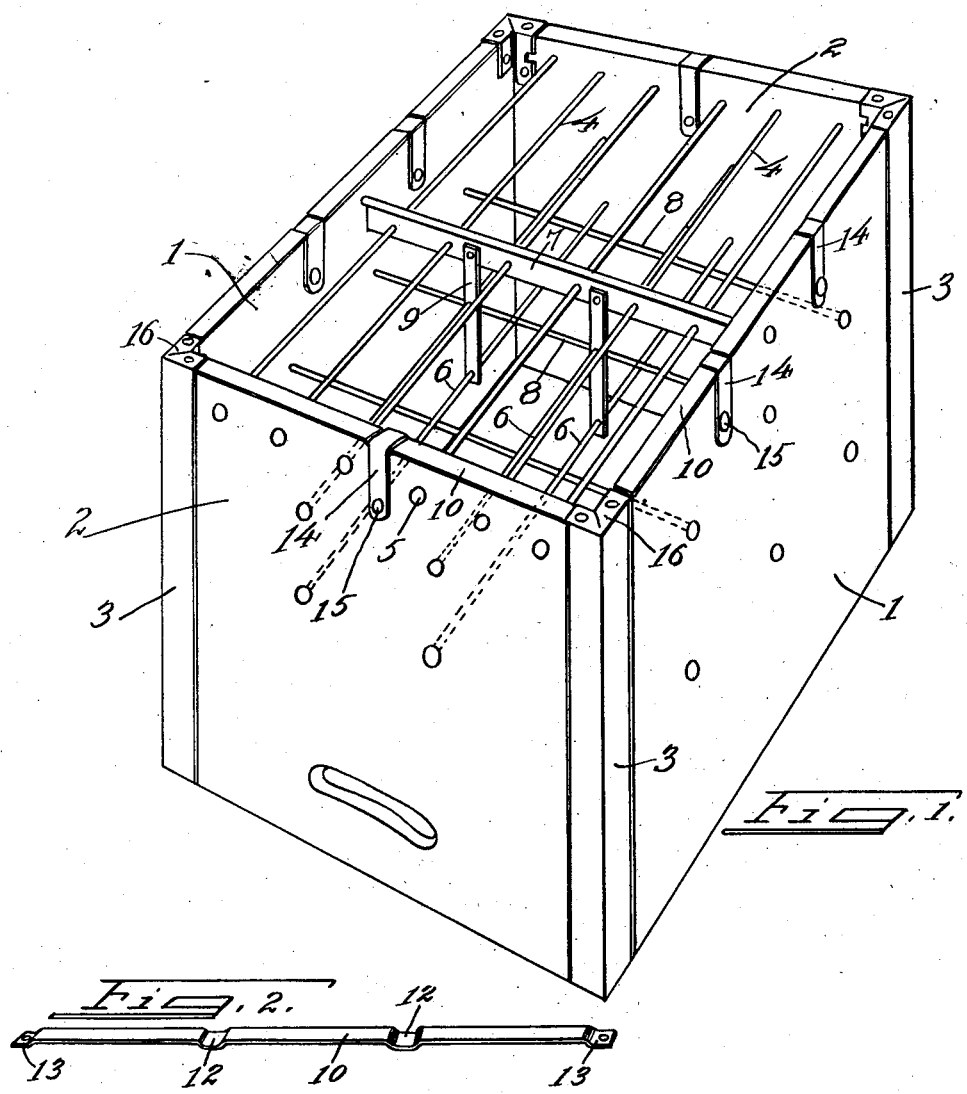
INVENTOR:
Henry Wildberg
BY
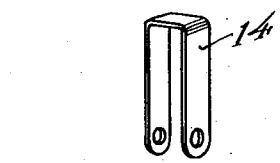
ATTORNEYS.

Patented Oct. 5, 1926.

1,601,789

UNITED STATES PATENT OFFICE.

HENRY WILDBERG, OF CINCINNATI, OHIO.

BOTTLE CRATE.

Application filed March 9, 1925. Serial No. 14,036.

My invention relates to crates, particularly designed for the shipment of milk bottles and it belongs to that class of bottle crates formed with wooden sides and ends, open at the top and provided with bottom made up of wire rods suitably braced forming a crate usually known as a "wire rod" crate.

Such crates when packed are usually slid along the floor of the car or platform, and in dairy plants over systems of roller conveyors, and in washing the bottles, the bottles are held in the crates while subjected to the jets of water in the usual washing machine. Such crates must therefore be amply protected on the bottom edges to slide smoothly on the floor and conveyors, and as they are subject to being soaked with water unless specially constructed to withstand the treatment to which they are subjected, such crates are liable to become loose at the corners. The holes in the wooden ends for securing the wire rod supports which necessarily have to be in alignment, necessarily tend to weaken the wooden frame at the points where the casing should be the strongest.

It is the object of my invention therefore to provide a crate which shall accomplish the desired results indicated above, and it consists of that certain novel construction and arrangements of parts to be hereinafter particularly pointed out and claimed for the above purpose.

In the drawing:

Figure 1 is a perspective view bottom side up of my improved crate.

Figure 2 is a perspective view of one of the bottom strips.

Figure 3 is a similar view of one of the clips for securing the bottom strips.

The crate is made up of wooden sides and ends 1, 1, and 2, 2, secured together in any effective way and with angle irons 3 to embrace and protect the corners. The wire bottom is made up of a suitable number of wire rods 4, 4, preferably galvanized to prevent rust and these rods are extended through holes in the wooden ends of the crate and riveted as shown at 5. Additional rods 6 and 8 are also provided to divide the crate into compartments for the bottles.

A substantial cross brace 7 is also employed to brace the bottom wires of the crate, and through which the bottom rods 4, 4, are passed and vertical bars 9, 9, are riveted to the cross brace 7, through which the rods 6 are passed, whereby a strong and substantial inner compartment framework is obtained.

Along the bottom edges of the sides and ends I secure metal protecting strips 10 which run the length of the sides and ends. These strips are formed with offsets 12, 12, at suitable points and the ends of the strips are also offset at 13. To secure the strips in place and to avoid the use of nails which would frequently become loose and drop out as the crate became soaked with moisture, and then dried out, I employ clips 14 which are seated in the offsets 12 and at the upper ends are riveted through the side walls of the crate. The legs of these clips are sufficiently long so that the rivet holes as shown at 15, are not in alignment with the rod holes for the rods 4. For the side strips 10 I secure a clip on either side of the cross brace 7 which thus strengthens this cross brace. The bottom edge of the side and ends is cut away to receive the offsets 12, and the surface of the clip lies flush with the outer surface of the strips.

The corners of the crate are recessed to receive the offset portions 13, 13, of the strips and this recess is sufficiently deep to receive the inturned ends 16 of the angle irons, which are nailed down over the ends 13 so as to be flush with the surface of the strips to provide a perfectly smooth sliding surface for the crate without any upturned edges.

Having thus described my invention, what I claim as new and desire to secure by Letters Patent, is:—

1. A bottle crate having side and end walls with bottom edges of the side and end walls reinforced with metallic strips, said bottom edges of said walls having recesses extending in interspaced relation laterally across said edges, and said metallic strips having offset portions so interspaced as to fit within the recesses when the bodies of said strips are laid flatwise along said bottom edges, and means of securing said reinforcing strips to the bottom edges of the crate at intervals throughout the length of the bodies, said means secured to walls of said crate in portions interspaced from said bottom edges.

2. A bottle crate having side and end walls with bottom edges of the side and end walls reinforced with metallic strips, said bottom edges of said walls having recesses extending in interspaced relation laterally across said edges, and said metallic strips having offset portions so interspaced as to fit within the recesses when the bodies of said strips are laid flatwise along said bottom edges, and means of securing said reinforcing strips to the bottom edges of the crate at intervals throughout the length of the bodies, said means secured to walls of said crate in portions interspaced from said bottom edges, said means comprising upright U shaped clips with studs adapted to be secured to the walls of the crate at their open ends.

3. A bottle crate having side and end walls with bottom edges of the side and end walls reinforced with metallic strips, said bottom edges of said walls having recesses extending in interspaced relation laterally across said edges, and said metallic strips having offset portions so interspaced as to fit within the recesses when the bodies of said strips are laid flatwise along said bottom edges, and means of securing said reinforcing strips to the bottom edges of the crate at intervals throughout the length of the bodies, said means secured to walls of said crate in portions interspaced from said bottom edges, said means comprising upright U shaped clips with studs adapted to be secured to the walls of the crate at their open ends, and said clips and reinforcing strips shaped and so arranged as to provide a level bottom bearing surface.

HENRY WILDBERG.